July 29, 1930.  G. ARNOLD  1,771,833

MACHINE FOR MAKING BOLTS, SCREWS, AND THE LIKE

Filed Nov. 10, 1928   5 Sheets-Sheet 4

July 29, 1930. G. ARNOLD 1,771,333
MACHINE FOR MAKING BOLTS, SCREWS, AND THE LIKE
Filed Nov. 10, 1928 5 Sheets-Sheet 5

Patented July 29, 1930

1,771,833

UNITED STATES PATENT OFFICE

GUSTAV ARNOLD, OF NUREMBERG, GERMANY

MACHINE FOR MAKING BOLTS, SCREWS, AND THE LIKE

Application filed November 10, 1928, Serial No. 318,533, and in Germany September 26, 1928.

This invention relates to an automatic machine for making bolts, screws and the like, in continuous operation. More particularly, the machine of my present invention is designed to operate by continuously introducing thereinto the work-piece in the form of a rod or wire from which bolt-shaped smooth or threaded pieces are worked out and separated in continuous succession. In general, the machine according to my invention comprises a rotary cutter of the kind ordinarily used in machines of this class, said rotary cutter being mounted upon a disk-shaped cutter-head, by means of which the said rotary cutter will rotate around said rod or wire which is introduced into and fed through the machine in order to impart the desired final shape thereto and to produce smooth or threaded bolts or screws as above indicated.

A machine designed in accordance with the principles of my invention permits a continuous mass production of smooth, unthreaded bolts as well as of threaded bolts, such as screw-bolts or the like in a simple, convenient and expeditious manner from raw material in the form of a rod or wire. In particular, the screw-bolts which are produced by my present machine in addition to the thread may further be provided with a slot at their head-piece so that the screw-bolts furnished by said machine will be in complete condition and require no further finishing work whatever.

The machine according to my invention therefore is especially well suited for the manufacture of large or small shaped articles, for instance bolts or similarly shaped pieces such as screw-bolts, and may conveniently and safely be operated in continuous operation without any disturbances for mass-production of said articles or pieces.

In the accompanying drawings I have represented an example of the machine according to my present invention. In the drawing Fig. 1 is a longitudinal side-view of a complete machine constructed according to my invention, Fig. 2 a top-view, partly in section, taken on Fig. 1, Fig. 3 an axial detail view of the driving mechanism for the cutter-head, as seen from the feed-end into which raw material in the form of a wire or rod is introduced, Fig. 4 a similar detail view of said cutter-head as seen from the cutter, showing only the cutter-head together with its driving mechanism, Fig. 5 a similar detail view, partly in section, of the driving shaft for the cutter-head, as seen from the cutter, an additional thread cutting and cutting-off tool being shown in connection therewith, Figs. 6 to 8 are detail views, partly in section, of the cutter-head, Fig. 9 a detail-top view of the cutter which co-operates with the rod or wire from which shaped pieces are continuously produced, Fig. 10 a longitudinal section according to line II—II of Fig. 4, through the disk carrying the cutter, the driving mechanism for the thread-cutting tool and cutting-off device being shown in particular, Fig. 11 a longitudinal section, partly in elevation, according to line III—III of Fig. 5 showing the disk carrying the cutter, the thread cutting tool as well as the cutting-off device.

Referring now more particularly to the drawing, the machine according to my invention comprises as main elements, a feeding device A of the form of a poppet. and a driving mechanism B for the cutter-head, said feeding device engaging with said driving mechanism in the rear thereof. A further main element of the machine consists of an additional poppet C which is arranged in front of the driving mechanism for the cutter-head to form a guide for the work-piece when being introduced into the machine. These three main elements of the machine co-operate with each other and are mounted in proper co-operative relation upon a common base-plate 1. More particularly, the driving shaft for the cutter-head is mounted in fixed position and the feeding device for the work-piece as well as the additional poppet are mounted longitudinally displaceable and adjustable by means of a screw-spindle which may be operated by a hand-lever.

The driving mechanism B for the cutter-head is mounted in a casing 2 and consists of the disk 4 carrying the cutter which disk is mounted rotatably on a hollow hub and may be driven by means of a pulley 3 fast on said hollow hub. A cam 5 is mounted on the rear end of said hollow hub, said cam serving for a purpose described further below. In the interior of the hollow hub the disk 4 of the cutter is equipped with a pivot or gear 6 concentric with the axis of the disc-shaped cutter head which gear during rotation of said disk 4 will likewise rotate and transmit rotation to the gripping members of the feeding device for the work-piece by means of a worm-like thread on said pivot or gear 6. The special construction and mode of operation of the feeding device for the work-piece is described further below.

Figures 3, 6, 7, 8, 9:
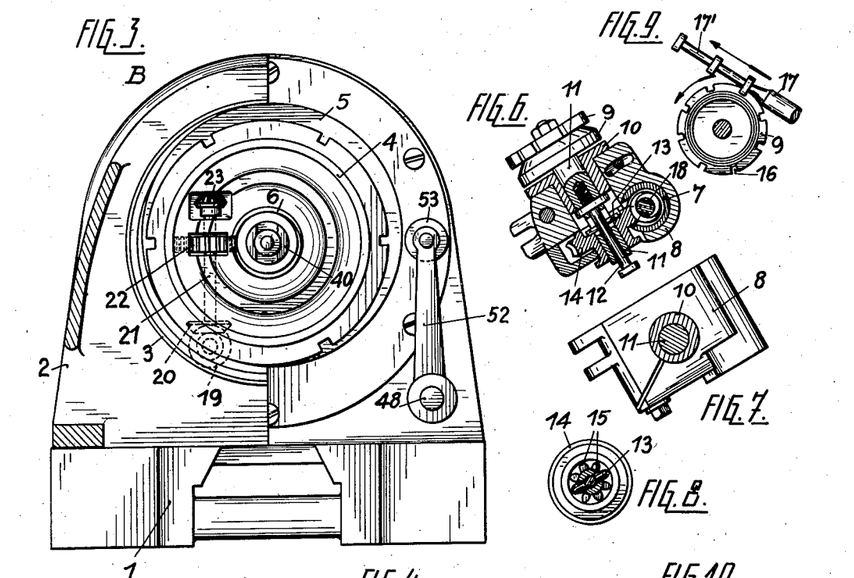
Figures 4, 10:
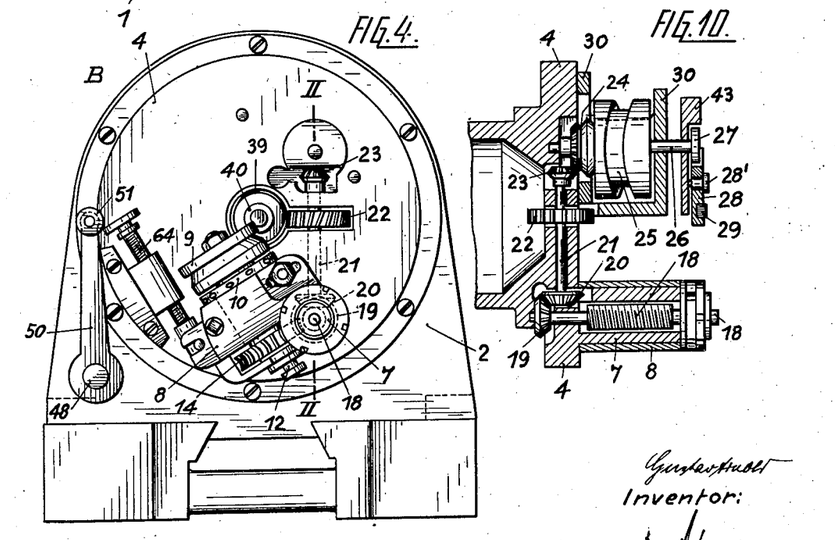
Figure 5:
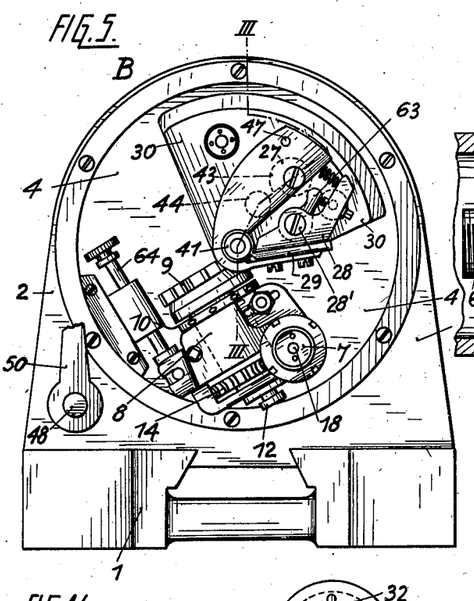

Referring to Figs. 4 and 6, on the front side of the disk 4 of the cutter there is mounted the carrier proper 8 for the cutter-head, which carrier is mounted angularly adjustably around a hollow axle 7. Adjustment of said carrier 8 with respect to said hollow axle 7 may be accomplished by means of an adjusting screw 64. The carrier 8, therefore, may be raised or lowered in order to exactly adjust the rotary cutter 9 having a profile shaped in accordance with the desired final shape of the work-pieces to be produced with respect to the axis of the machine and with respect to the motion of the work-piece 17 passing through said machine.

The rotary cutter 9 is equipped with a central bolt or journal 11 by means of which it is rotatably mounted in the carrier 8, an eccentrical chuck or sleeve 10 being interposed between said journal 11 and said carrier 8. The forward feed of the cutter is effected by means of a worm-wheel 14 which is mounted upon the journal 11 to permit either positive motion of said journal with or disengagement from said worm-wheel. This worm-wheel 14 engages through a slot provided in the hollow axle 7 with a driving worm 18 mounted within said hollow axle and is driven by means of a more rearwardly positioned bevel-gear 19. In order to disengage the journal 11 of the disk 4 which carries the rotary cutter 9, the worm-gear 14 is provided with the interior radial stops 15 as shown in Fig. 8, said stops engaging with a transverse locking pin 13 which projects through longitudinal slots from said journal 11 and is mounted upon a resilient pressure rod 12 positioned within a hollow part of the journal 11 and pressed towards the outside by action of a spring, so that the pin 13 will engage with the radial stops provided in the worm-gear 14, thus causing the journal 11 together with the rotary cutter 9 to positively rotate with said worm-gear 14.

If it is desired to arrange the rotary cutter so as to freely rotate for the purpose of permitting adjustment thereof or in order to conveniently remove the rod-shaped work-piece after having been partly operated upon by said cutter, the pressure rod 12 is moved towards the inside in opposition to the action of a spring, this inward motion of the rod 12 causing the transverse locking pin 13 to be lifted from the stops 15 provided within the worm-gear 14. If the eccentrical chuck or sleeve 10 is adjusted by rotating the same within the carrier 8 for the cutter-head or disk 4, the central axis of the cutter 9 as well as journal 11 and the effective cutting edge of the cutter may be brought into a greater or smaller distance from the central axis of the machine, or what is the same, from the work piece introduced thereinto.

The rotary cutter 9 is driven by means of the worm-gears 14 and 18 as shown in Fig. 6, and the bevel-gear 19 fast on the worm-shaft which bevel-gear 19 meshes with another bevel-gear 20 fast on the axle 21 mounted within the disk 4, as shown, for instance in Fig. 10. The axle 21 carries a further gear or worm-wheel 22 and at its other end a second bevel-gear 23 as shown in Figs. 4 and 10. The gear or worm-wheel 22 and therewith the axle 21 is driven by a worm 39 mounted within a central bore of the disk or the cutter-head 4, said worm being fast on a hollow shaft 40 serving for the reception of the work-piece which is introduced in the form of a rod or wire into the machine. This hollow shaft 40 passes in rearward direction through the central threaded pivot 6 of the disk or cutter-head 4 and is kept in fixed position by means of a discharge guide member 67 provided with a square extension 67' and arranged at the forward end of the feeding device A for the work-piece, as shown in Figs. 2 and 3.

If now the hollow hub provided on the disk or cutter-head 4 is driven by means of the pulley 3, the hollow axle 40 and therewith the worm 39 will remain at standstill, while the disk or cutter-head 4 will rotate and carry with it the axle 21, thus causing the gear or worm-wheel 22 to roll on the worm 39 which is fast on the hollow axle 40, thus effecting positive rotation of the axle 21 and the gears 20 and 23 mounted thereon.

Motion will now also be transmitted to the profiled rotary cutter 9 by way of the carrier 8 for the cutter-head 4, said cutter 9 now rotating around its own axis 11 in addition to its planetary motion around the rod-shaped work-piece 17, the rotation of the cutter around its own axis effecting likewise the forward feed thereof. The work-piece 17 now will be exposed to the action of the rotary cutter 9 in such a manner that, for instance, proper gaps 16 between the cutting edges of the rotary cutter will produce profiled pieces 17' cut into the rod 17 in the form of bolts which are provided with a head member, as shown in Fig. 9.

In order to provide these profiled pieces with a thread for the purpose of making screw-bolts or the like and to cut-off the profiled and threaded pieces from the work-piece, said pieces are separately cut-off the rod-shaped work-piece. In like manner smooth, unthreaded bolts may be cut-off the work-piece. For this purpose the disk or cutter-head 4 is further provided with a proper device likewise controlled from the driving axle 21 which serves for the drive of the rotary cutter 9, said axle 21 being mounted within said disk 4 and rotating therewith.

The drive for the cutting-off device which will simultaneously act as a thread-cutting device, is derived from the upper bevel-gear 23 fast on the driving axle 21. As may be seen particularly from Figs. 5 and 10 and 11 to 15, there is provided a casing 30 which is fixed on the disk or cutter-head 4, a cam 25 being mounted freely rotatable around a shaft fixed in said casing 30, said cam 25 being alternately engaged with and disengaged from the driving bevel-gear 24 which meshes with the upper bevel-gear 23 on the driving shaft 21. The driving bevel-gear 24 is provided with a clutch member 31 on its interior side facing the cam 25, a locking pin 32 engaging with said clutch-member, said pin being mounted longitudinally displaceable within the cam 25 and being laid around the axle of the cam with its circularly bent end 34. The pin 32 is controlled by the double-armed lever 35 which is likewise laid with its circularly bent end around the axle of the cam 25 and mounted swingably in bearings 36, a retracting spring 38 tending to press said lever 35 inwardly, that is towards the cam 25 and consequently causing the pin 32 to engage with the teeth 31 provided on an extension of the bevel-gear 24.

Figure 12:
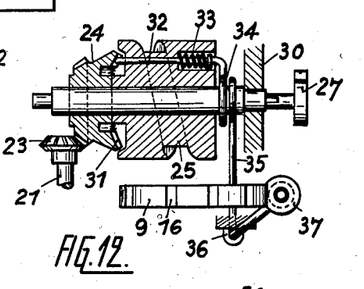
Figs. 12 to 15 are enlarged detail-views, partly in section of the driving and controlling organs for the thread-cutting tool and the cutting-off device together with driving means controlled by the cutter, Fig. 16 an axial view of an additional or front poppet provided at the feed end of the machine, Fig. 17 a lateral view and horizontal cross-section of the feed channel associated with said front poppet, Fig. 18 a longitudinal section through the feeding device proper for the work-piece, said feeding device being likewise constructed in the manner of a poppet, Figs. 19 to 21 a side-view, plan-view and front-view, respectively, of the feeding device shown in Fig. 18, and Figs. 22 to 25 are enlarged detail views, said detail views showing the constructions of the several elements of the feeding device and the gripping members provided thereon for gripping the work-piece in various longitudinal and transverse sections as well as in open and closed condition of said gripping members.
Figures 13, 14:
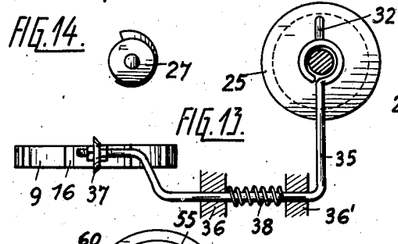
Figure 15:
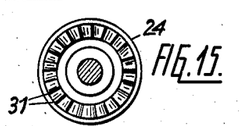

Upon the free end of the double-armed lever 35 there is mounted a guide-roller 37 engaging with the periphery of the rotary cutter 9 and causing the lever 35 to swing inwardly to bring about engagement of the pin 32 with the bevel-gear 24, if said guide-roller 37 is in engagement with a recessed part 16 of the periphery of the rotary cutter 9. On the other hand said lever 35 will swing outwardly thereby disengaging the pin 32 from the bevel-gear 24, whenever said guide-roller 37 rides upon a more elevated part of the periphery of the rotary cutter, as indicated in Figs. 12 and 13.

Figure 11:
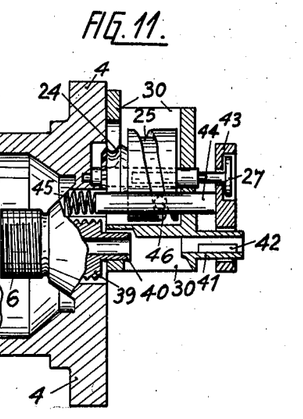

The casing 30 and the cam 25 mounted therein is controlled by the plate 43 which is mounted upon a bolt-shaped shaft 44 which is under the action of a spring 45 and engages by means of a laterally projecting pivot 46 with a curved groove cut into the periphery of the cam 25. The plate 43 in order to permit axial displacement thereof is secured by means of a bolt 47 and further guided by means of the plate-shaped discharge member 41 for the work-pieces, said discharge member being positioned in the prolongation of the hollow worm-shaft 39 and the sleeve 40 and carried by the casing 30. The work piece is provided with a slot or recess 42 at its under half, said slot or recess permitting the cutting tool 29 carried by the plate 41 to come in working position with respect to the rod-shaped work-piece which is passed through the machine (Fig. 11).

The plate 43 is further provided with a recess serving for the reception of a spirally shaped cam 27 mounted upon an axle 26 which may be drawn out of the axle of said cam 25, said axle 25 being keyed or otherwise fastened thereto to move positively therewith. This cam 27 acts upon a tool-holder 28 by way of an intermediate member having the form of a short lever 63 with a rounded end which lever is mounted on the plate 43 and may be swung around the screw-bolt 28' against the action of a retracting spring. In this way the cutting tool 29 which is fixed within its holder will project with its front cutting edge through the slot 42 into the discharge member 41, and may be swung back by said retracting spring, while moving inwardly by action of the cam 27. The cam 27 is so constructed that the point of the thread cutting tool will engage during a proper period of time with the work-piece carried through the driving mechanism for the cutter head, thus cutting a thread into the work-piece. Finally the thread cutting tool serves simultaneously for cutting off the threaded bolt and will again be moved inwardly by the cam 27, this inward motion causing the profiled or threaded bolt to be cut off the rod-shaped work piece. After the operation of cutting off said bolt the most elevated point of the cam 27 will move past the extensions of the ring-shaped member 63, said retracting spring will now come into action, thus causing the tool-holder 28 with thread-cutting tools therein to move towards the outside. The thread cutting tool now will commence to cut near the head of the bolt and gradually move towards the rear end thereof, the pitch of the thread being determined by the cam 25, which gradually moves the thread-cutting tool to a proper extent in backward direction in additional dependence from the velocity of feed of the work-piece. This rearward feed is continued for such a length of time until the rear end of the screw-bolt has been reached by the thread-cutting tool and the thread cut into the bolt all over its length.

The action of the cam 27 in particular is as follows: The cam 27 controls the tool-holder 28 which is swingable around the point 28' in such a manner that the tool 29 in said tool-holder will be swung back in a definite position of the cam 27, said tool coming now out of engagement of the work-piece. In another position of the cam 27 the tool comes into proper engagement with the work-piece to effect the operation of thread cutting whereupon said tool at the end of the operation of thread cutting will be more deeply depressed into the work-piece so that the latter will be cut off the rod in the form of a completely threaded bolt. The tool, therefore, works as a single point tool which is used for the operation of thread cutting as well as for the subsequent operation of cutting off the threaded bolt.

After completion of the thread-cutting operation the cam 27 will move the thread-cutting tool into proper position so as to cut-off the threaded bolts from the work-piece. The plate 43 which acts as a carrier for the tool 29 will be moved forward by action of the cam 25 in accordance with the feed of the work-piece in order to perform the cutting-off operation.

At this moment the latter will be properly moved to cut-off the completed screw-bolt from the rod-shaped work-piece. At the same time the pin 32 will be released by means of the lever 35 controlled by the rotary cutter 9, and the cam 25 will be separated from the bevel-gears 24 and 23, so that motion of the plate 43 and the tool 29 carried thereby will be discontinued until the operation of cutting-off the bolt or the like has been completed. After completion of this operation, the cam 25 which is again in engagement with the bevel gears 23 and 24 will move the plate 43 and therewith the thread-cutting and cutting-off tool 29 into its front position in which said tool will remain until it comes again into thread-cutting engagement with the subsequent portion of the rod-shaped work-piece. The plate 43 together with the tool 29 may of course also immediately be moved towards the outside by providing a proper recess at the cam disk 25, said recess suddenly releasing the carrier 44 for said plate 43 which carrier is under the action of the spring 45, after completed cutting-off a smooth bolt or screw-bolt from the rod-shaped work-piece. By action of said recess in the cam 25 the carrier 44 for the slide plate 43 will again be brought into feeding position during which the operation of thread-cutting commences, whereupon the cam 25 which is provided with a proper groove will be disengaged from the bevel gears 23 and 24 and again engage with said bevel-gears 23 and 24 if the subsequent operation of the thread-cutting takes place.

As a matter of course, the feeding motion necessary to effect the thread-cutting operation which feeding motion is exerted upon the plate 43 carrying the thread-cutting tool 29 may be rendered ineffective in special cases. This, for instance, is desirable in a machine which is intended solely for the purpose of making smooth, unthreaded bolts or similarly shaped pieces which merely need to be cut-off the rod-shaped work-piece, after completed operation of the rotary cutter. For this purpose the cam 27 is properly shaped to effect the control of the tool 29 so as to perform the operation of cutting off. The cam 27 in this case is likewise driven from the bevel-gears 23 and 24, while the cam 25 will be rendered ineffective which may, for instance, be accomplished by taking the pivot 46 out of the shaft 44 which carries the plate 43, or by using a smaller cam without any curved groove therein, the pin 32 which serves for operating the driving gears 24 and 23 being in this case retained within said smaller cam.

Figure 1:
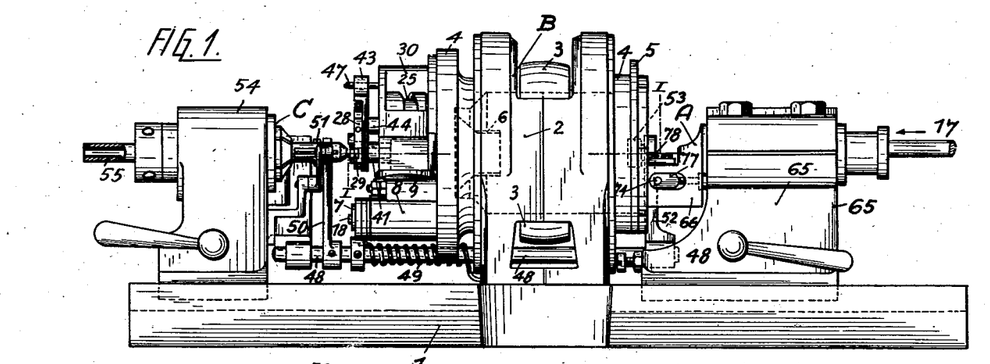
Figure 2:
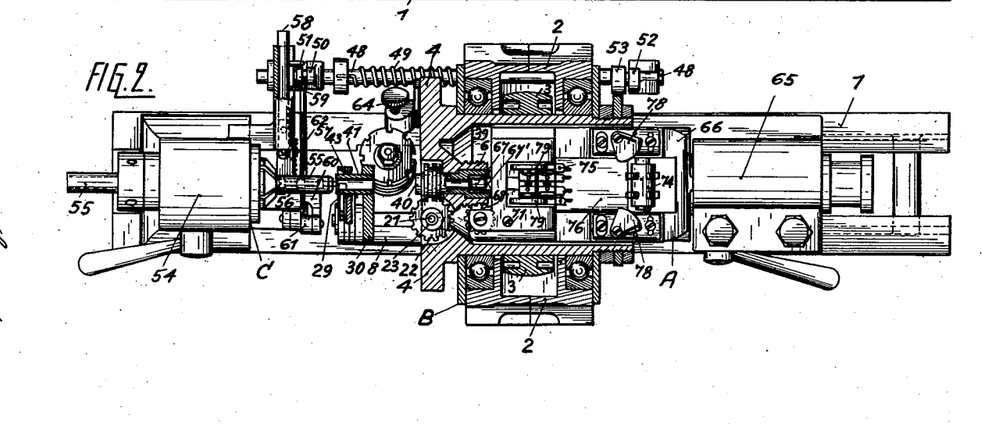
Figure 23:
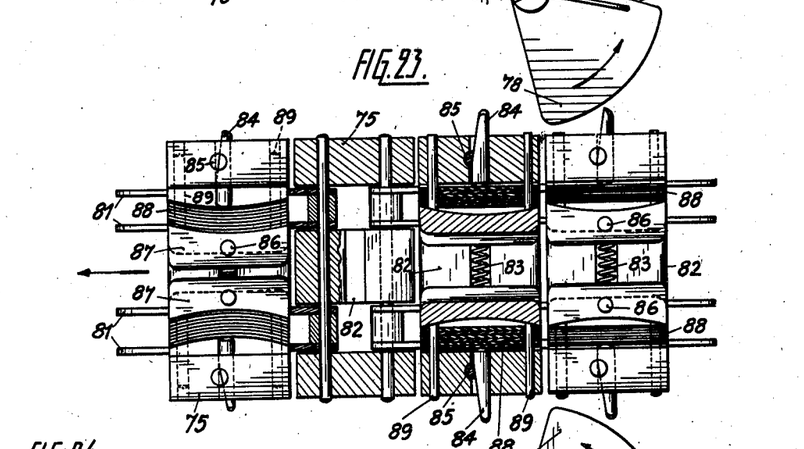
Figure 24:
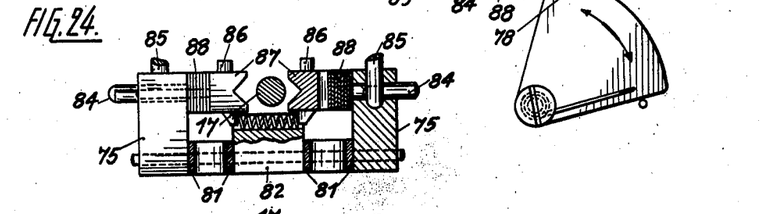
Figure 25:
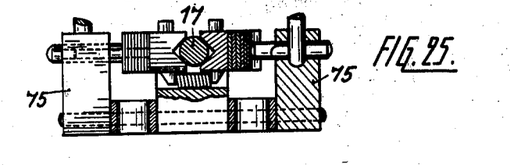

The work-piece in the form of a rod or wire is moved forward through the machine by means of the feeding device A consisting of a loose head stock or poppet 65 which is slidably mounted upon the base plate 1 and may be fixed thereon, for instance, by means of a threaded spindle operated by a hand-lever, as indicated in Figs. 1 and 2, similarly to the poppet C. The poppet 65 carries the feed member proper 66 which latter extends freely from said poppet, said feed member proper being provided with a central longitudinal bore permitting reception of the rod-shaped work-piece and being provided at its ends with a discharge device 67 having a rectangular extension 67' thereon. The discharge device 67 as above mentioned projects into the hollow axle 40 of the worm 39, which is mounted centrally in the disk or cutter-head 4 and keeps said hollow axle in fixed position so that only the said disk or cutter-head will be able to rotate together with the rotary cutter mounted thereon and together with the devices serving for the thread-cutting and cutting-off of individual pieces from the work-piece. Laterally of the front end of the feed member 66 there is mounted a gear-wheel 68, said gear-wheel engaging during feeding motion of said feed member 66 with the interior threaded pivot 6 of the disk or cutter-head 4, which causes by its own rotation the wheel 68 to roll off the threaded pivot 6 and therewith bring said feed member into feeding condition. For this purpose the driving gear-wheel 68 is connected with a gear-wheel 69 which meshes with a companion gear-wheel 70 fast on a worm-shaft 71. The worm on said worm-shaft 71 co-operates with a worm-wheel 72 fast on a shaft 73 carrying a sprocket wheel 74 which is connected by means of a chain formed by a plurality of blocks with a further sprocket wheel 74 mounted within the feed member 66. One of the sprocket wheels, for instance 74, may be adjusted in longitudinal direction by means of slide-bearings 77. The two sprocket wheels 73 and 74 thus form a drive for the blocks 75 connected with each other in the manner of a chain which is carried around said sprocket wheels. A bridge-shaped guide 76 serves for guiding said chain of blocks 75. The blocks 75, as may especially be seen from Figs. 22 to 25 consists each of a rectangular member connected by the aid of intermediate members 82 and chain links 81. The gripping jaws 87 proper are fastened onto each of these blocks 75 by means of the slide-bolts 89 and are provided at their upper surfaces with a small pivot 86 and slide upon said intermediate chain member 82 on their under surfaces, a groove serving for properly guiding said blocks upon said central members. Intermediate the blocks 75 and the individual gripping jaws 87 there are provided bridges consisting of a plurality of adjacent leaf-springs 88 which are likewise supported by said slide-bolts 89 which project into said leaf-springs. The gripping jaws 87 are somewhat rounded off on their surfaces facing said blocks 75 and are controlled by pressure-bolts 84 acting laterally against said bridges of leaf-springs 88. The pressure-bolts 84 are wedge-shaped and may be locked or released by further wedge-shaped bolts 85 which are longitudinally movable within the blocks 75 and acted upon by spring-pressure. Intermediate the gripping jaws 87 there is provided a pressure spring 83 within a groove on the intermediate chain-member 82, said spring having the tendency to move said gripping jaws away from each other as soon as the pressure bolts 84 are released by the wedge-shaped bolts 85. The gripping jaws 87 may now be moved into position for gripping the work-piece by means of the pressure-bolts 84 which during motion of the chain formed by the blocks 75 and the further connecting members 81 and 82 will be moved into the path of motion of arcuate or segmental swinging members 78 as shown in Fig. 23. By this motion the bolt 85 will be released and moved upward by action of a spring, thus causing the pressure bolt 84 to be locked as soon as the latter has moved out of the range of action of the members 78, which will again swing back into their original position in order to co-operate with the subsequent pair of pressure-bolts.

In closed condition the pivots or jaws proper 86 firmly grip the work-piece 17, the leaf-spring bridges 88 being now bent, thus bringing about the required resilient, yet powerful gripping pressure of said jaws. In this manner the work-piece will be simultaneously gripped by three or more pairs of jaws which at a time are moved forward by the chain of blocks 75. The jaws will therefore uniformly move forward, in accordance with the feeding motion of said chain of blocks 75, into the poppet which carries the rotary and into the thread cutting and cutting-off device.

In proximity to the front end of the feed member 66 the pairs of jaws will open in succession prior to their downward motion and release the rod-shaped work-piece as new pairs of jaws come into action at the rear portion of the chain of blocks 75. Opening of the jaws is accomplished by means of disk-shaped pressure members 79 (Fig. 22) which are arranged on the feed-member 66 above the path of motion of the wedges 85 mounted in the blocks 75. The wedges 85 during closing motion of the jaws are lifted and forced outwardly by the pressure-disks 79, the pressure-bolts 84 are now released and move away from each other by action of the pressure springs 83 positioned intermediate said jaws.

Figures 19, 20, 21:
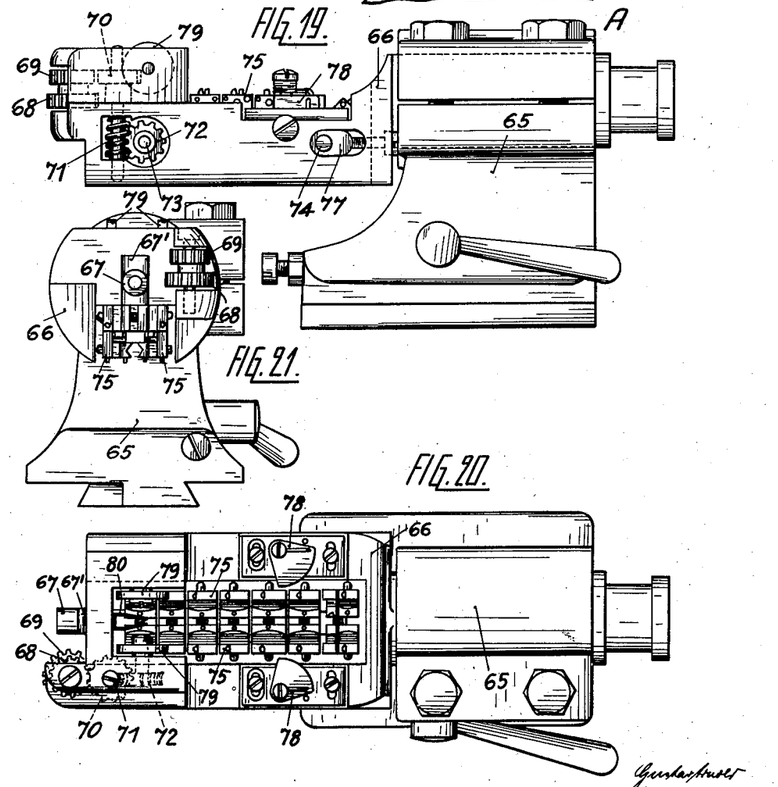
Figure 22:
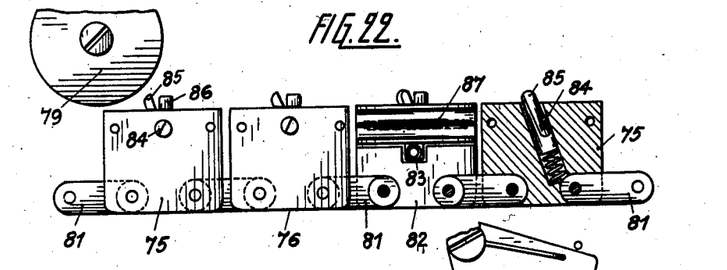

The opening motion of the jaws is further assisted by the stretching tendency of the leaf-springs 88 and preferably controlled in addition by means of a conical spreading clip 80 (Fig. 20), fastened on the front end of the feed-member 66 and entering with its lateral parts into the path of motion of the small pivotal members 86, this causing said jaws to further move away from each other (Fig. 20).

The velocity of the feed motion of the chain of bolts 75 for the rod-shaped work-piece is controlled in dependence from the speed of rotation of the threaded pivot 6 on the disk-shaped or cutter-head 4 and will naturally be in accordance with the speed of the planetary rotation of the rotary cutter, the speed of rotation around its own axis and the operation of the thread-cutting and cutting-off device. In particular, the ratio between the speed of retrogressive motion of the thread-cutting tool and the feed of the work-piece must be properly chosen in order to obtain the proper pitch of thread on the bolts to be worked upon by said thread-cutting tool.

In the rear of the cutter-head, there is further provided an additional poppet C which consists of a stationary member 54 carrying a reception tube 55 into which the several work-pieces after being worked upon by the cutter-head are introduced before the cutting-off operation takes place, so that said work-pieces during said latter operation will be properly guided within said tube 55 (Fig. 2).

The material is fed from the right towards the left and the cutting tool comes into operation before the work-piece to be cut off is entirely inserted into said tube 55. During the cutting-off operation the bolt is positioned with its front half in the tube 55, while its rear end yet projects out of said tube. This may especially be seen from Figs. 2 and 17 which figures show that the completed screw-bolts—which eventually may yet be in connection with the rod by means of a small intermediate piece—are held in place and prevented against yielding in lateral direction.

Figure 16:
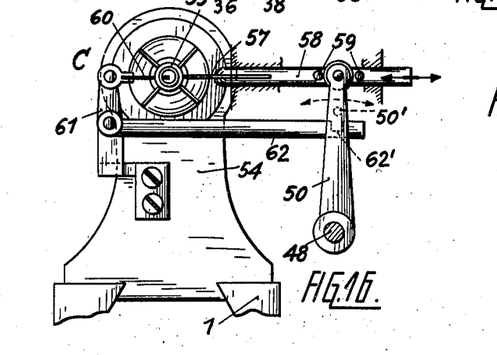
Figure 17:
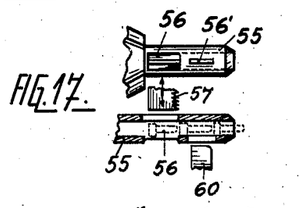
Figure 18:
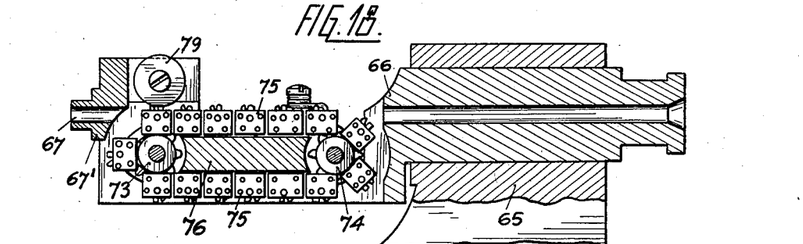

If the machine is intended for the production of screw-bolts having a slotted head there is provided a saw 57 which projects into a guide-slot in the tube 55. The latter is cut-off at the opposite side to form a recess or slot 56 of a width corresponding to the interior diameter of said tube, said slot 56 serving to throw out the several work-pieces towards the side after having been operated upon by said saw. (Fig. 17.) In this case the threaded bolt to be provided with a slotted head is likewise positioned within the tube 55 which moves from the side into an aperture of the saw 57. The completed screw-bolts are therefore partly positioned within the tube 55 during cutting the slot into the head of the bolts, thus providing a guide for said bolts preventing the latter against lateral motion. Preferably there is further provided a caliper or template 60 which enters the interior of the tube 55 through a slot 50' in order to contact with the work-piece at a time passing through said tube. The several work-pieces, therefore, will determine the position of said caliper or template 60, that is they will cause the latter to come into a greater or smaller distance from the tube. This caliper, as shown in Fig. 16, is mounted on the short arm 61 of a crank-lever, while the longer arm 62 of said crank-lever will determine the contact pressure for said caliper 60 and for this purpose is provided with a locking recess 62'. If the caliper 60 is now pressed in outward direction by the head of a screw-bolt or the like passing through the tube 55, the arm 62 of said crank-lever will move upward and engage by means of the recess 62' the pin 50' carried by a swinging lever 50 which imparts a reciprocating motion to the saw 57.

The saw 57 after completed incision of a slot into the head of a screw-bolt or the like will be kept in its outermost position until the subsequent work-piece has been fed so much forward that it will be ready for being operated upon by the saw. If now the caliper or template 60 again comes into contact with the spindle-shaped part of the work-piece it is moved towards the inside, the arm 62 of the crank-lever will swing downward and the recess 62' will release the pin 50' on the swinging lever 50 which imparts reciprocating motion to the saw. The subsequent work-piece may now be worked upon by the saw. The preceding work-piece which had already been slotted being positioned within the range of action of the saw in the tube 55 will now be thrown-out through the slot 56 in the tube 55 as soon as the saw again commences to operate.

The saw 57 is carried within a guide-member fastened on the stationary part 54 of the poppet C and fixed to an actuating rod 58 which is provided with lateral stops or the like 59. The roller 51 (Fig. 4) of the swinging lever 50 will now move intermediate the said stops 59. The swinging lever 50 is fixedly mounted upon a shaft 48 carried by the casing 2 of the poppet for the cutter-head. The rear end of the shaft 48 further carries a lever 52 with a roller 53 thereon contacting with the cam 5 on the hollow shaft 4 of the knife head. The shaft 48 which carries the swinging lever 50 is kept under the action of a spring 49 which constantly forces the swinging lever towards the inside thereby pressing the guide-roller 53 of the lever 52 constantly against the cam 5. The eccentricity of the cam 5 will now cause swinging of the driving lever 50 for the saw, said driving lever imparting a reciprocating motion to the saw as long as this lever is not temporarily locked by the crank lever 62, in which case the cam 5 will not act upon the shaft 48 and the swinging lever connected therewith.

I claim:

1. Machine for making shaped pieces in the form of bolts, screws or other profiled articles in continuous operation from a work-piece in the form of a rod or wire, said machine comprising a rotary cutter adapted to rotate around said work-piece in cutting engagement therewith, feeding means for feeding said work-piece axially non-rotatably in longitudinal direction through said machine and relatively to said rotary cutter, a disk-shaped cutter head carrying said rotary cutter, a cutting-off device co-operative with said cutter-head, gearing mechanism intermediate said cutter-head and said cutting-off device, said gearing mechanism adapted to move said cutting-off device in radial direction to said work-piece, a worm fixed centrally with respect to said cutter-head, and driving means intermediate said worm, said cutter-head and said cutting-off device.

2. Machine as specified by claim 1, in which the feeding means for the work-piece consist of a chain-like mechanism comprising gripping members adapted to grip the work-piece during its feeding motion and a gear concentric with the axis of the disk-shaped cutter head and co-operative with said gripping and feeding members.

3. Machine as specified by claim 1 having feeding means which comprise a feed-member associated with a poppet, said feed-member engaging with a hollow hub on the cutter-head, and a discharge device provided at the said feed-member, fixing means associated with said discharge device, said fixing means adapted to fix the centrally positioned worm with respect to the cutter-head to prevent relative rotation therebetween.

4. A machine as specified by claim 1, having feeding means consisting of a plurality of gripping and feeding members, a chain-like device carrying said feeding members and adapted to transversely adjust said gripping and feeding members, pressure-bolts adapted to bring said feeding and gripping members into gripping position, guide-pieces for controlling motion of said pressure bolts, vertically movable wedge-shaped members associated with said pressure bolts, pressure-organs co-operative with said wedge-shaped members during feeding of the work-piece through said machine, so as to release said pressure bolts and cause inward motion thereof and opening of said gripping and feeding members.

5. A machine as specified by claim 1, for making threaded bolts and the like, having a thread-cutting tool provided on the cutter-head in addition to the rotary cutter, a plate carrying said thread-cutting tool, a releasable cam for positively controlling the motion of said plate at least towards the inside of the machine, thus permitting threads to be cut into the work-piece in a direction away from the head of a screw-bolt, and a cam adapted to control motion of said thread-cutting tool so as to cut at a greater depth into the work-piece after completed operation of thread-cutting, thereby cutting off a completely shaped and threaded piece from the work-piece.

6. Machine as specified by claim 1, having a thread-cutting tool in addition to the rotary cutter, a cam adapted to control the position of said tool, a further cam adapted to control said rotary cutter, driving means for commonly driving both of said cams, said driving means co-operating with the cutter-head.

7. Machine as specified by claim 1, having a thread-cutting tool in addition to the rotary cutter, a cam adapted to control said thread-cutting tool, a driving gear adapted to engage with said cam, a pin associated with said driving gear, a pressure lever for engaging and disengaging said pin with or from said driving gear, and controlling means for controlling motion of said pressure-lever in accordance with the form of the profile of the rotary cutter, so as to alternately and positively engage and disengage said pin from said driving gear.

8. Machine as specified by claim 1, having a tube-shaped guide for the work-piece entering the machine, said guide being positioned at the place of discharge of profiled pieces and adapted to keep said work-piece in fixed position during cutting-off the shaped pieces therefrom.

9. A machine as specified by claim 1, for making threaded bolts and the like, having a thread-cutting tool provided on the cutter-head in addition to the rotary cutter, a plate carrying said thread-cutting tool, a releasable cam for positively controlling the motion of said plate at least towards the inside of the machine, thus permitting threads to be cut into the work-piece in a direction away from the head of a screw-bolt, a cam adapted to control motion of said thread-cutting tool so as to cut at a greater depth into the work-piece after completed operation of thread-cutting, thereby cutting off a completely shaped and threaded piece from the work-piece, and a saw associated with the machine, said saw adapted to cut slots into the heads of screw-bolts or the like after being shaped and threaded by said rotary cutter and said thread-cutting tool respectively.

10. A machine as specified by claim 1, for making threaded bolts and the like, having a thread-cutting tool provided on the cutter-head in addition to the rotary cutter, a plate carrying said thread-cutting tool, a releasable cam for positively controlling the motion of said plate at least towards the inside of the machine, thus permitting threads to be cut into the work-piece in a direction away from the head of a screw-bolt, a cam adapted to control motion of said thread-cutting tool so as to cut at a greater depth into the work-piece after completed operation of thread-cutting, thereby cutting off a completely shaped and threaded piece from the work-piece, a saw and a caliper device associated therewith and adapted to be controlled and adjusted by a work-piece after being worked upon by said rotary cutter and said thread-cutting tool, a lever associated with said caliper for arresting motion of the saw after completed cutting of a slot in the head of the preliminarily completed screw-bolt, and for maintaining said saw arrested until a subsequent work-piece has arrived in proximity to said saw.

11. A machine as specified by claim 1, for making threaded bolts and the like, having a thread-cutting tool provided on the cutter-head in addition to the rotary cutter, a plate carrying said thread-cutting tool, a releasable cam for positively controlling the motion of said plate at least towards the inside of the machine, thus permitting threads to be cut into the work-piece in a direction away from the head of a screw-bolt, a cam adapted to control motion of said thread-cutting tool so as to cut at a greater depth into the work-piece after completed operation of thread-cutting, thereby cutting off a completely shaped and threaded piece from the work-piece, a saw and caliper device associated therewith for cutting a slot into the head of a preliminarily completed screw-bolt, an additional guiding mechanism associated with said machine, a lateral opening provided in said additional guiding mechanism and adapted to co-operate with said saw so as to throw out the completely finished screw-bolt with the slot cut thereinto.

12. A machine as specified by claim 1, for making threaded bolts and the like, having a thread-cutting tool provided on the cutter-head in addition to the rotary cutter, a plate carrying said thread-cutting tool, a releasable cam for positively controlling the motion of said plate at least towards the inside of the machine, thus permitting threads to be cut into the work-piece in a direction away from the head of a screw-bolt, a cam adapted to control motion of said thread-cutting tool so as to cut at a greater depth into the work-piece after completed operation of thread-cutting, thereby cutting off a completely shaped and threaded piece from the work-piece, a saw for cutting a slot into the head of a screw-bolt shaped and threaded by said rotary cutter and said thread-cutting tool, a swinging lever associated with the saw, and a ring-shaped cam provided on the cutter-head, said cam adapted to control motion of said swinging lever to impart reciprocating motion to said saw.

In testimony whereof I affix my signature.

GUSTAV ARNOLD.